United States Patent
Kim et al.

(10) Patent No.: US 10,112,583 B2
(45) Date of Patent: Oct. 30, 2018

(54) WIPER BLADE ASSEMBLY

(71) Applicant: CAP Corporation, Sangju-si, Gyeongsangbuk-do (KR)

(72) Inventors: Jae Woong Kim, Sangju-si (KR); Young Hun Lim, Sangju-si (KR)

(73) Assignee: Cap Corporation, Gyeongsangbuk-Do (KR)

( * ) Notice: Subject to any disclaimer, the term of this patent is extended or adjusted under 35 U.S.C. 154(b) by 0 days.

(21) Appl. No.: 15/405,464

(22) Filed: Jan. 13, 2017

(65) Prior Publication Data

US 2018/0148017 A1    May 31, 2018

(30) Foreign Application Priority Data

Nov. 25, 2016  (KR) .................. 10-2016-0158519

(51) Int. Cl.
*B60S 1/38*    (2006.01)
(52) U.S. Cl.
CPC .......... *B60S 1/3848* (2013.01); *B60S 1/3874* (2013.01); *B60S 2001/382* (2013.01)
(58) Field of Classification Search
CPC ........ B60S 1/38; B60S 1/3801; B60S 1/3848; B60S 1/381; B60S 2001/3817; B60S 2001/382; B60S 1/3874
See application file for complete search history.

(56) References Cited

U.S. PATENT DOCUMENTS

| | | | | | |
|---|---|---|---|---|---|
| 3,006,018 | A | * | 10/1961 | Golab | B60S 1/3801 15/250.43 |
| 3,192,551 | A | * | 7/1965 | Appel | B60S 1/38 15/250.43 |
| 4,028,770 | A | * | 6/1977 | Appel | B60S 1/38 15/250.43 |
| 4,063,328 | A | * | 12/1977 | Arman | B60S 1/38 15/250.43 |
| 4,807,326 | A | * | 2/1989 | Arai | B60S 1/38 15/250.43 |
| 5,325,564 | A | * | 7/1994 | Swanepoel | B60S 1/38 15/250.44 |
| 6,226,829 | B1 | * | 5/2001 | Kotlarski | B60S 1/38 15/250.32 |
| 6,836,926 | B1 | * | 1/2005 | De Block | B60S 1/38 15/250.43 |

FOREIGN PATENT DOCUMENTS

| | | |
|---|---|---|
| GB | 1212131 * | 11/1970 |
| JP | 2002-362329 A | 12/2002 |
| KR | 10-1201547 B1 | 11/2012 |

OTHER PUBLICATIONS

Korean Office Action dated Oct. 18, 2017 issued in corresponding Korean Application No. 10-2016-0158519.

\* cited by examiner

*Primary Examiner* — Gary Graham
(74) *Attorney, Agent, or Firm* — Harness, Dickey & Pierce, P.L.C.

(57) ABSTRACT

According to the inventive concept, the distribution of the pressing pressure applied to the elastic member is controlled, and the contact force with which the contact member is pressed against the windshield of a vehicle is controlled by controlling the distribution of the pressing pressure of the elastic member, and, this improves the ability of the contact member to follow the windshield of the vehicle, thereby improving wiping characteristics of the wiper blade assembly.

4 Claims, 21 Drawing Sheets

[FIG. 1]
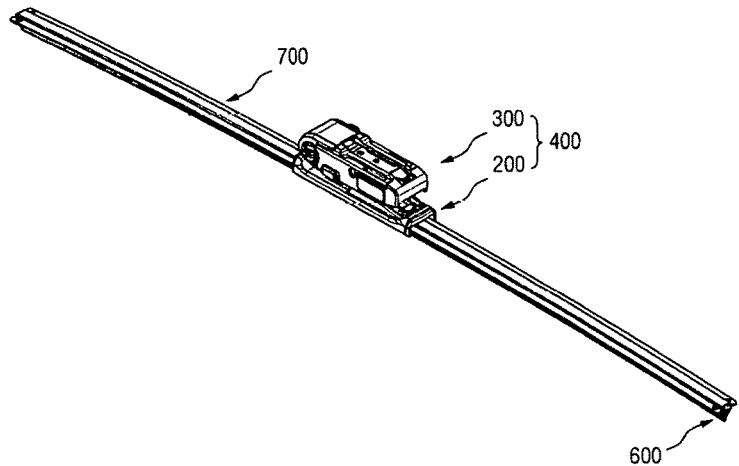
[FIG. 2]
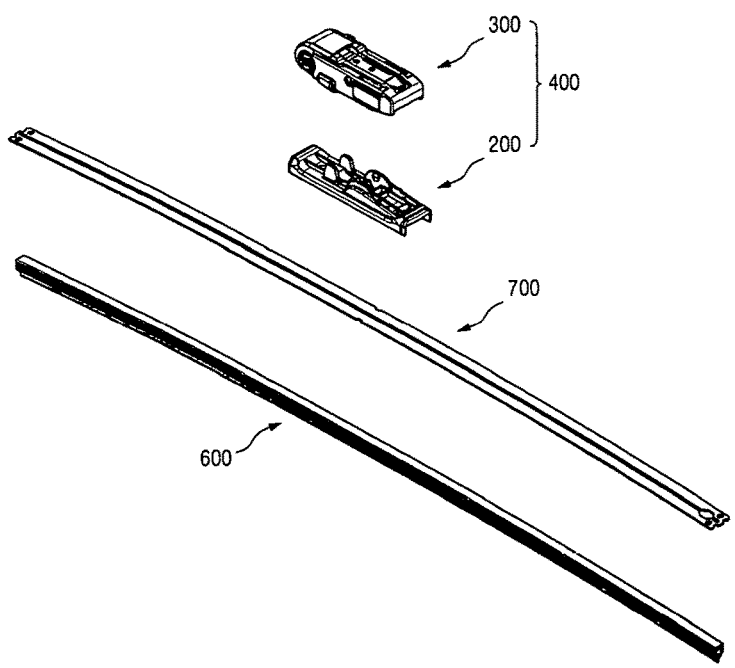

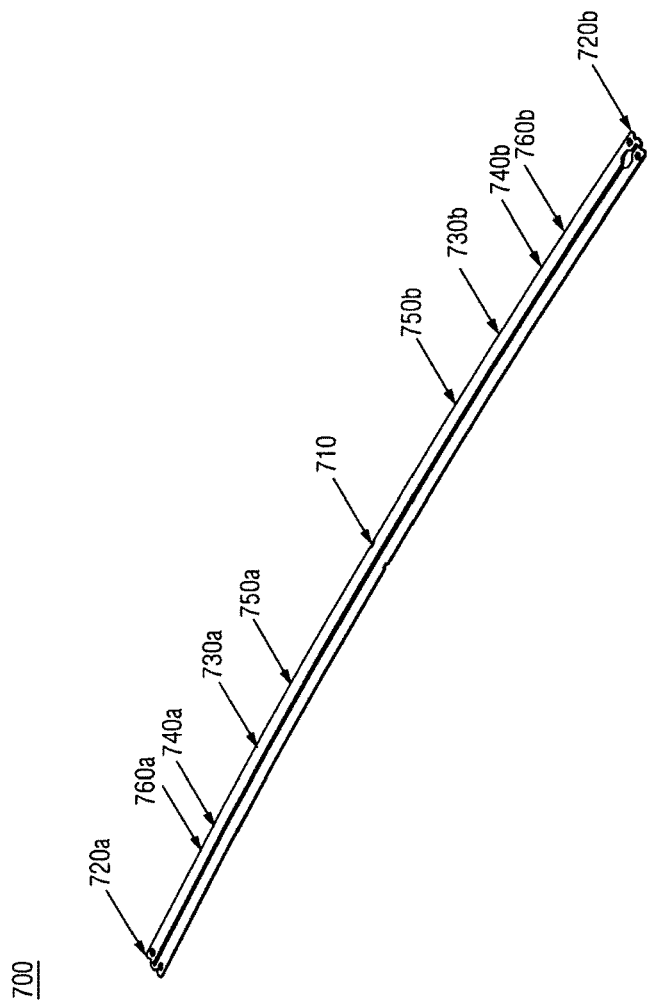
[FIG. 3a]

[FIG. 3b]
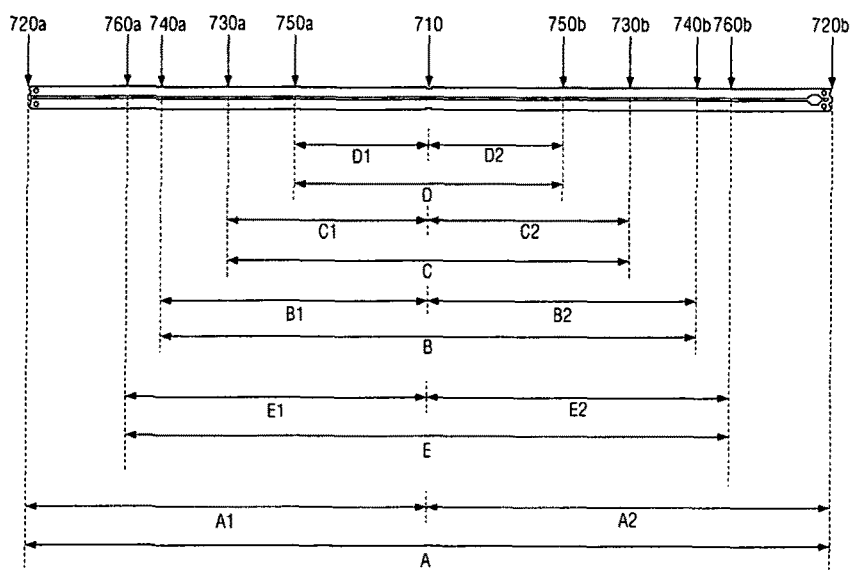

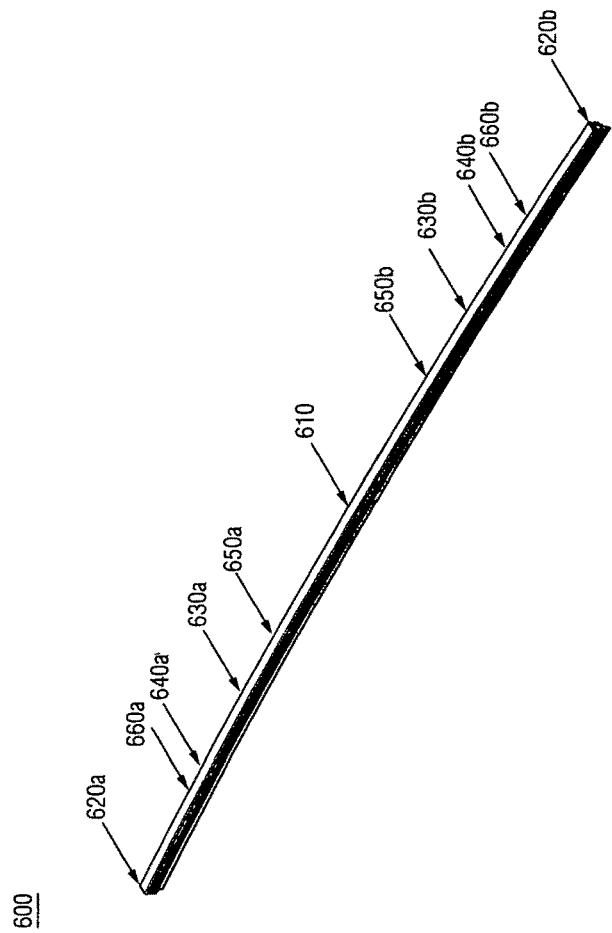
[FIG. 4a]

[FIG. 4b]
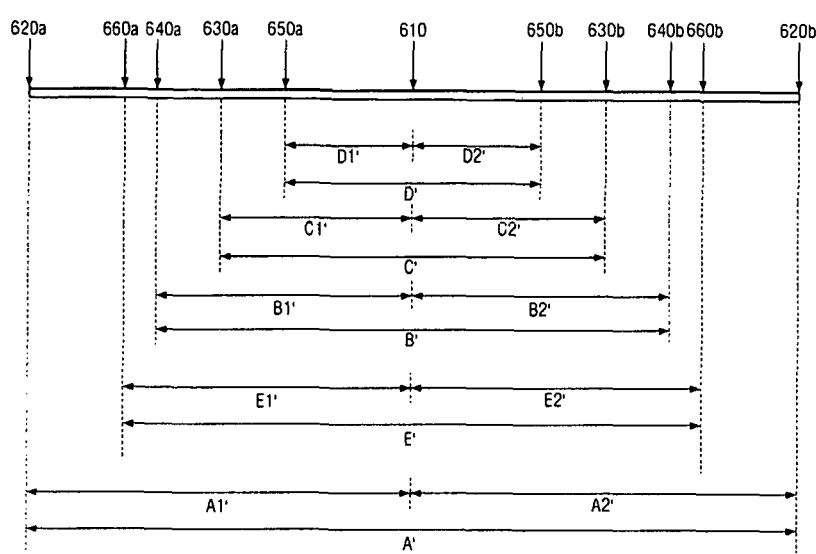

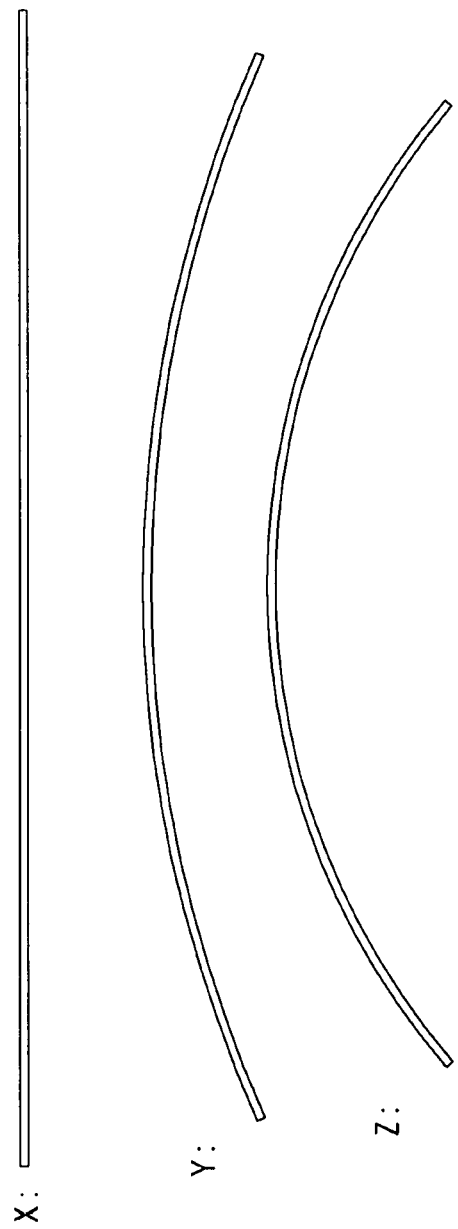
[FIG. 5]

[FIG. 6]
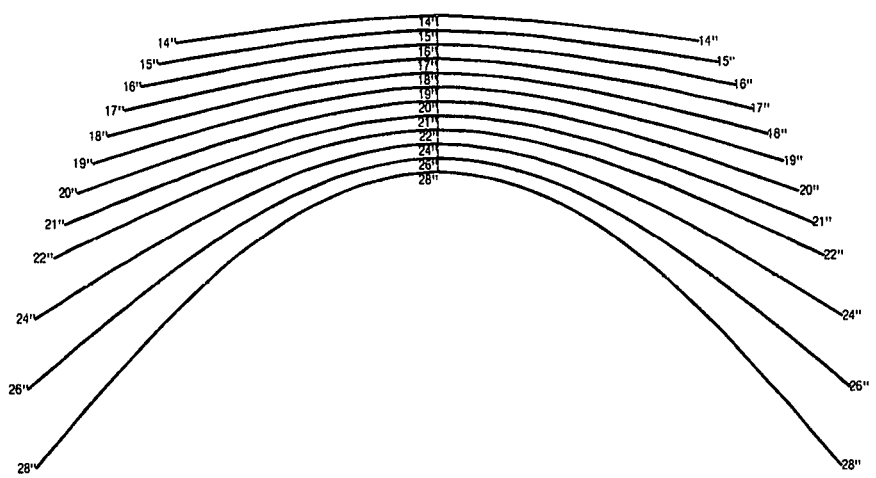

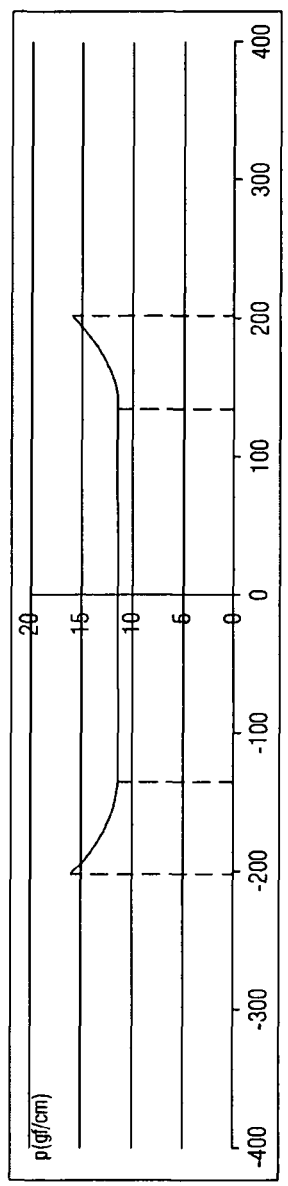
[FIG. 7]

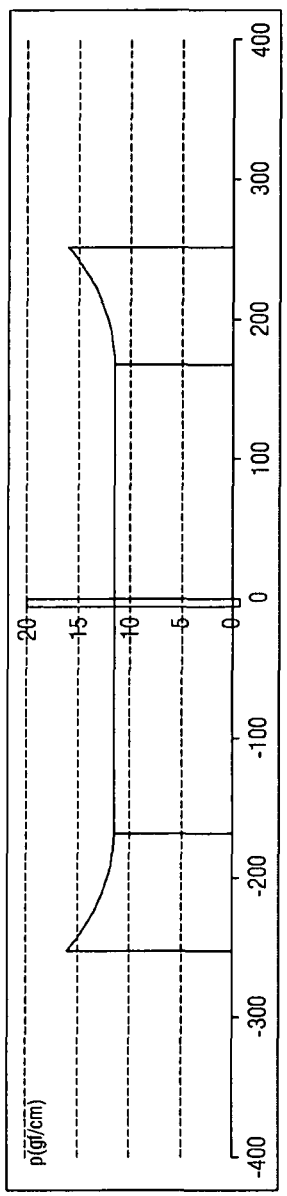
[FIG. 8]

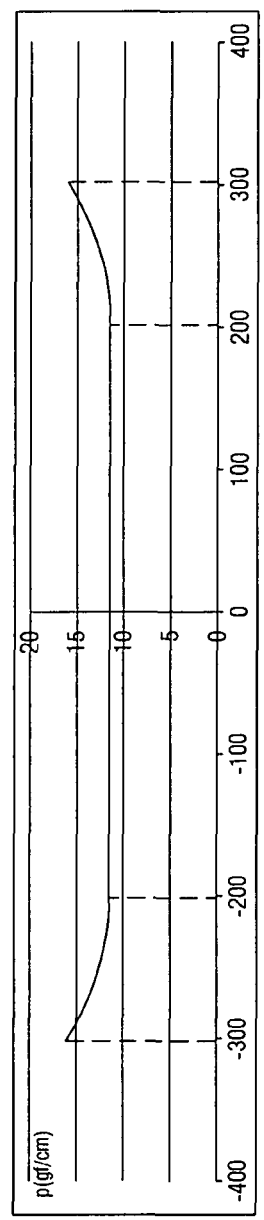
[FIG. 9]

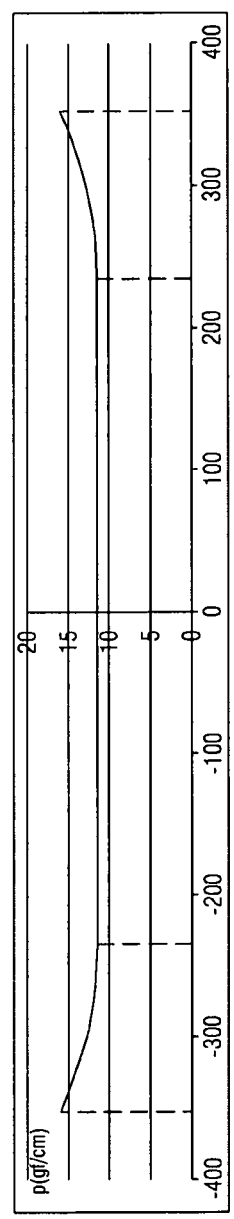
[FIG. 10]

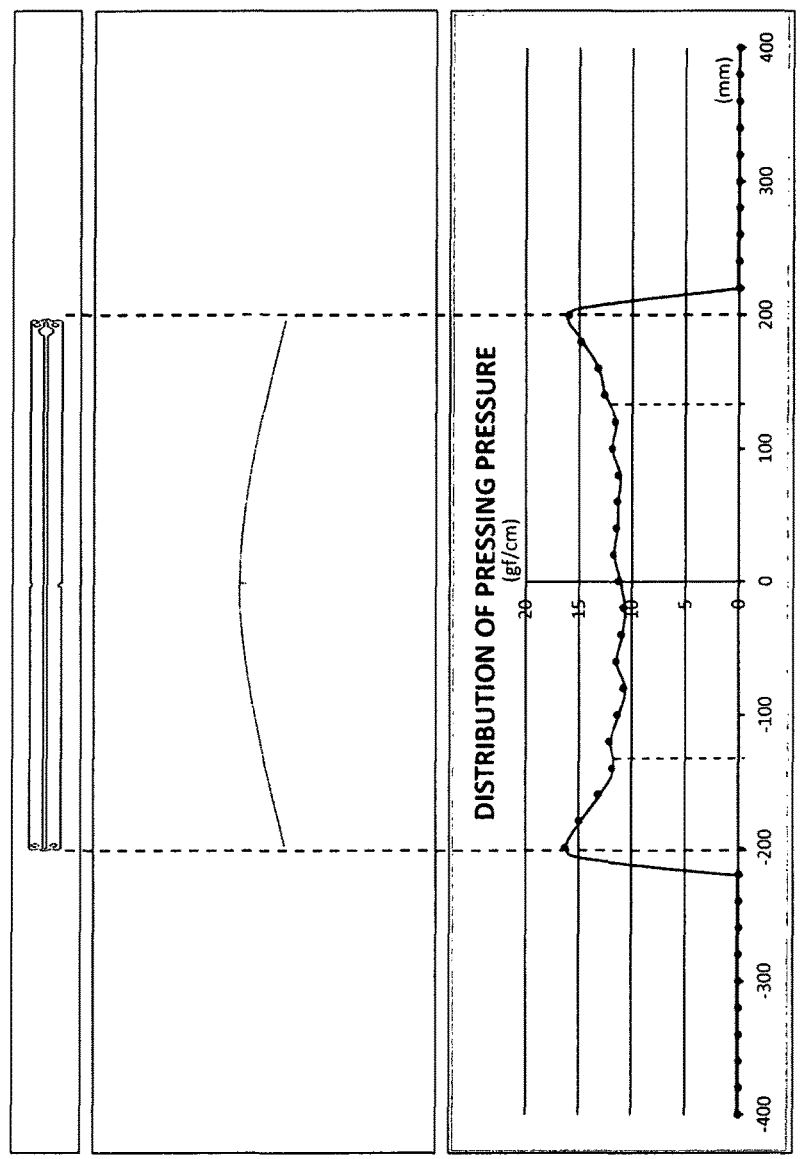
[FIG. 11]

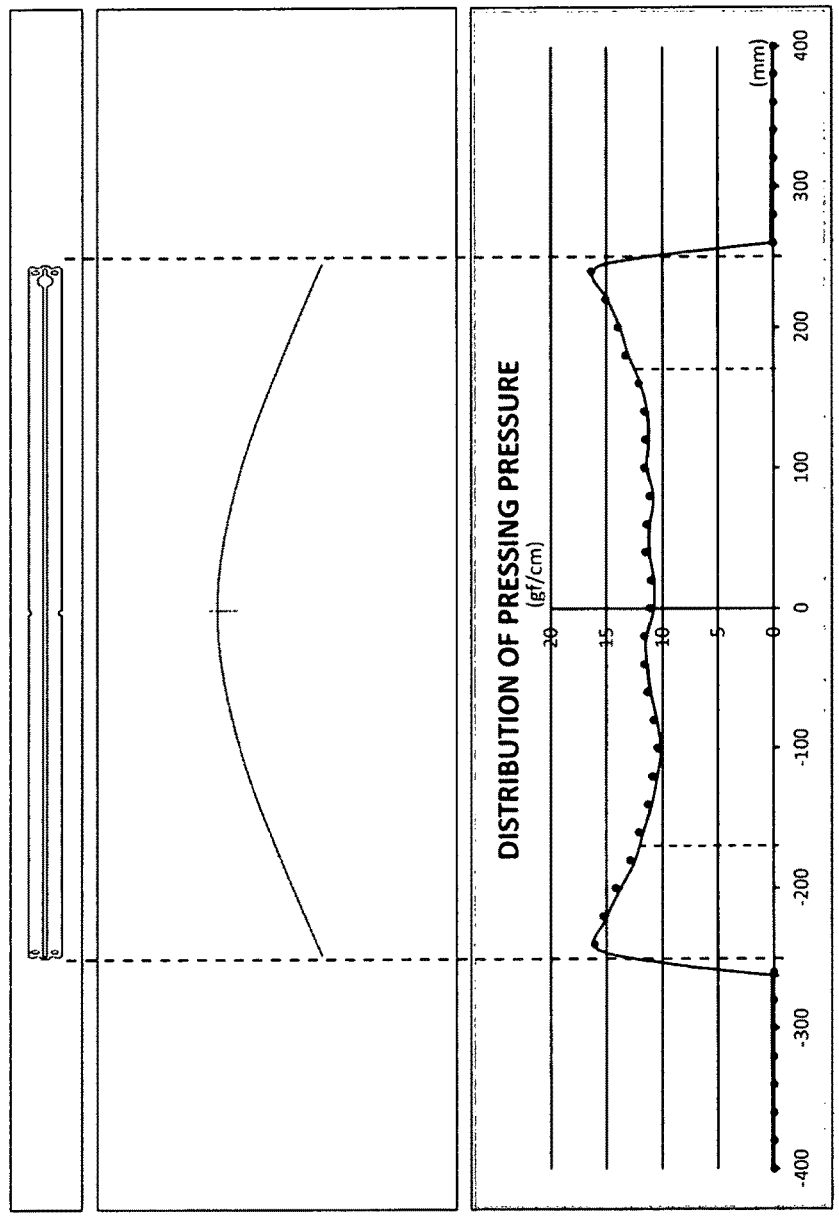
[FIG. 12]

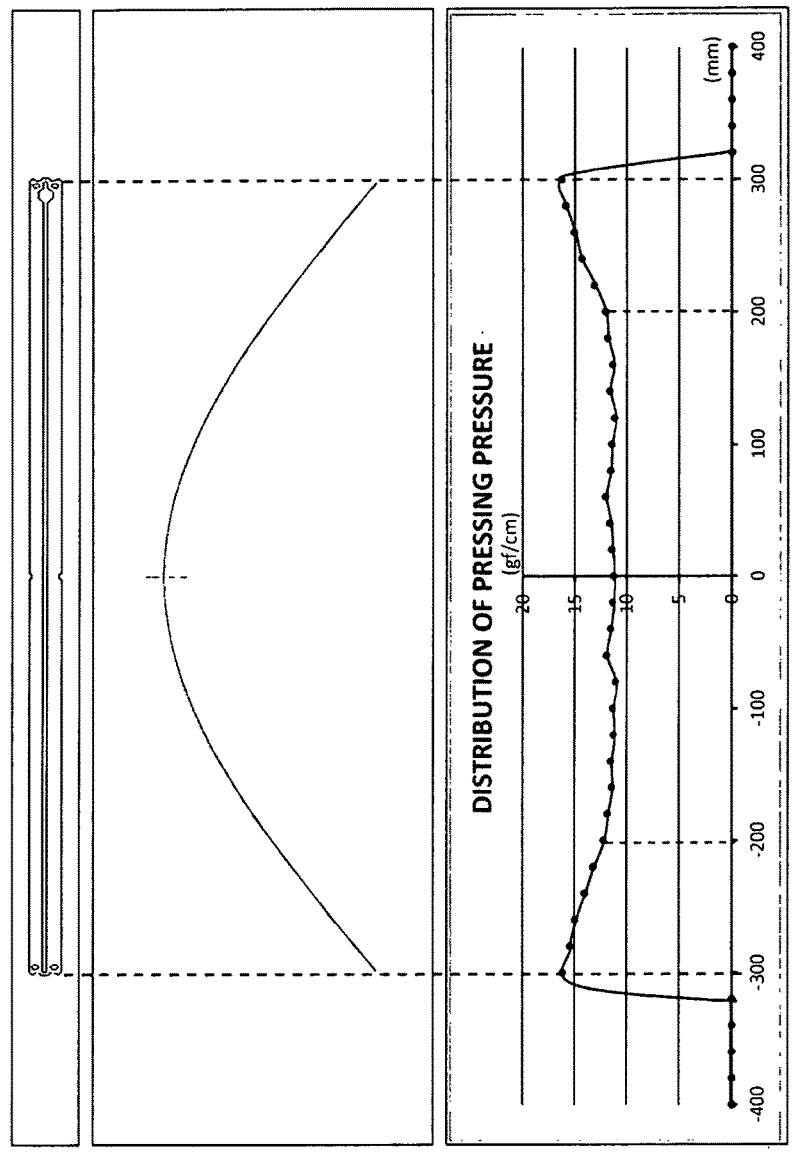
[FIG. 13]

[FIG. 14]
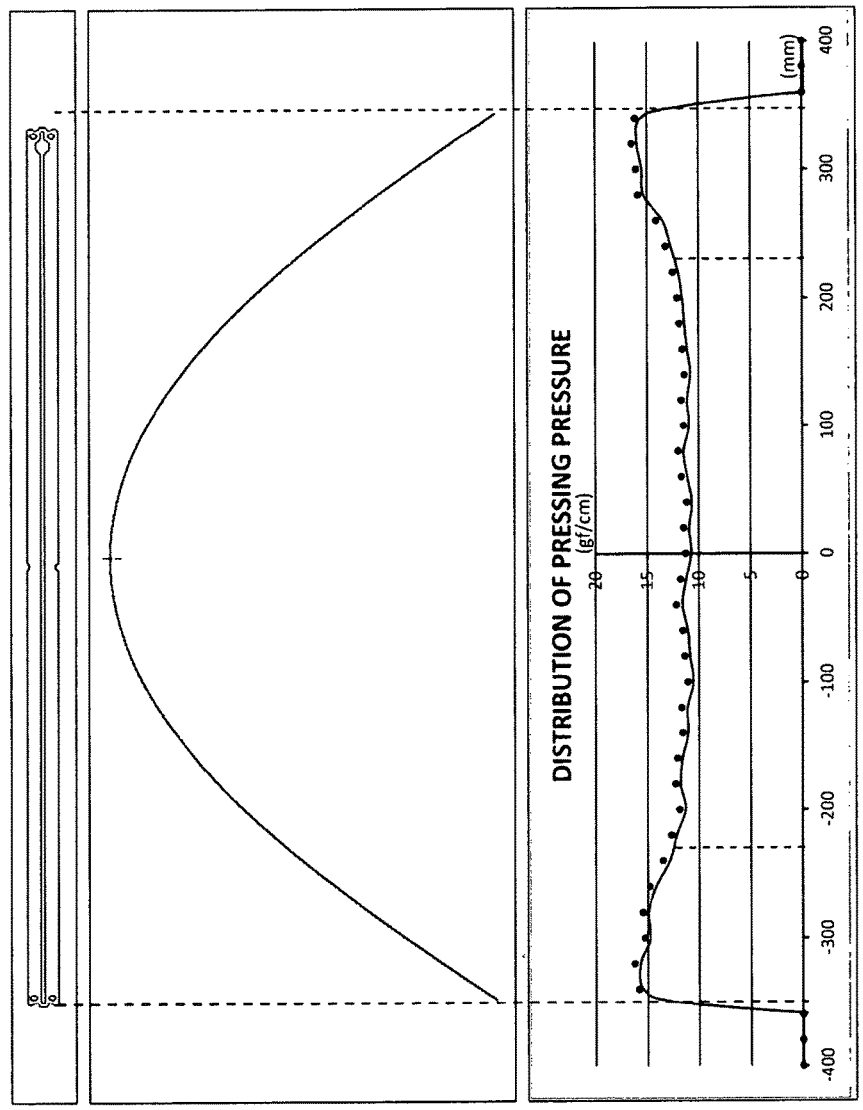

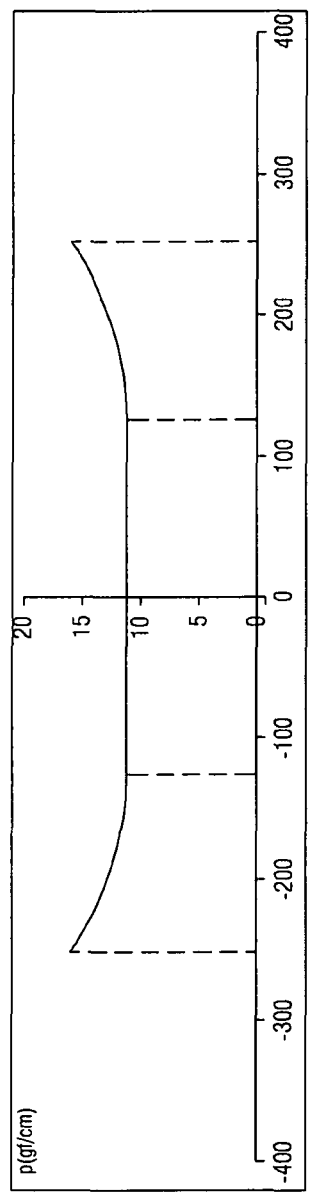
[FIG. 15]

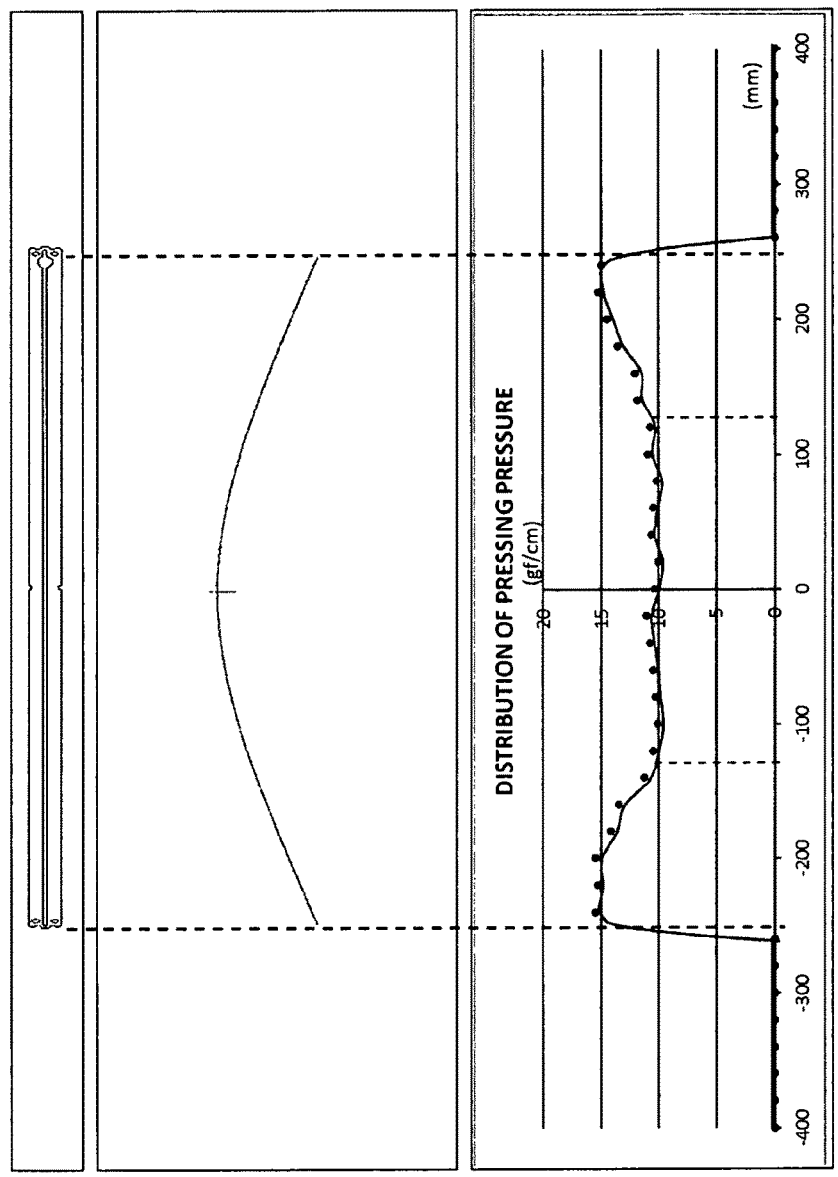
[FIG. 16]

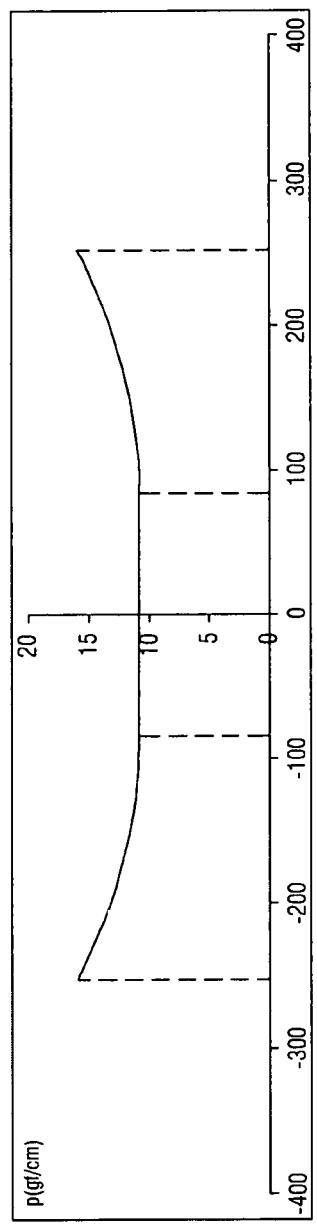
[FIG. 17]

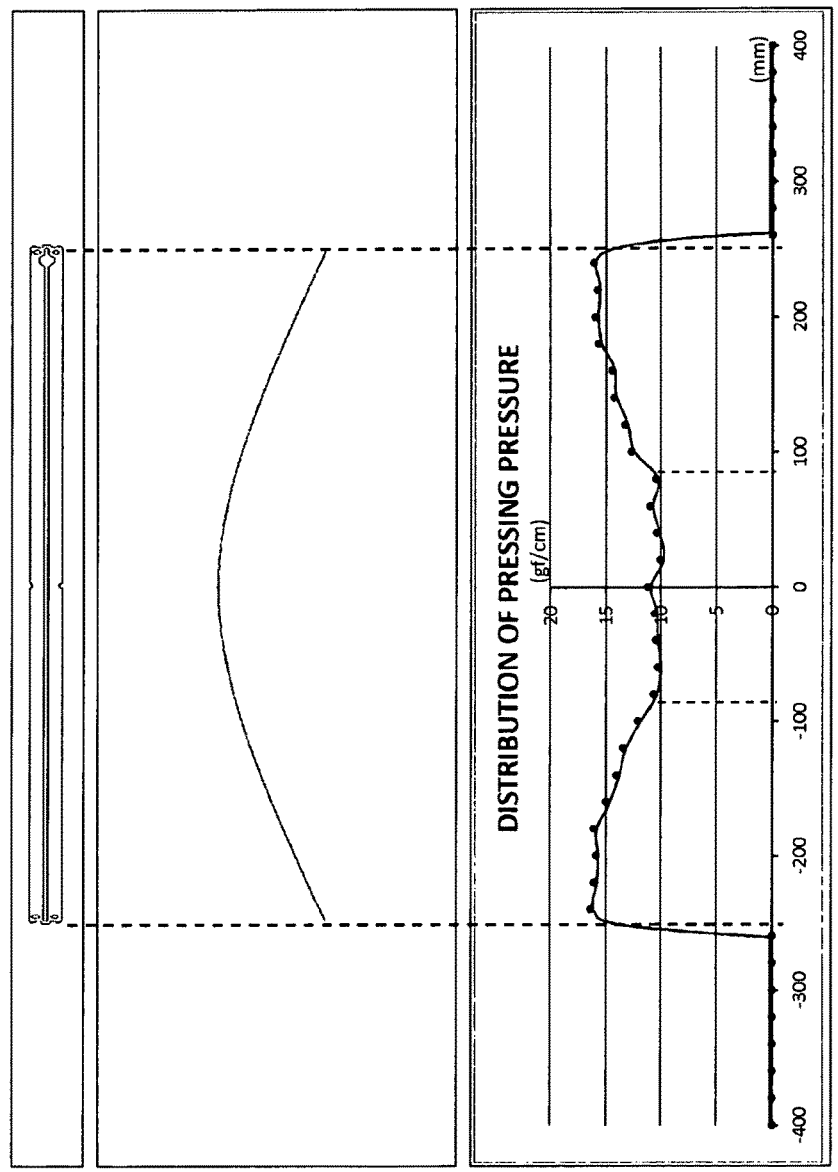
[FIG. 18]

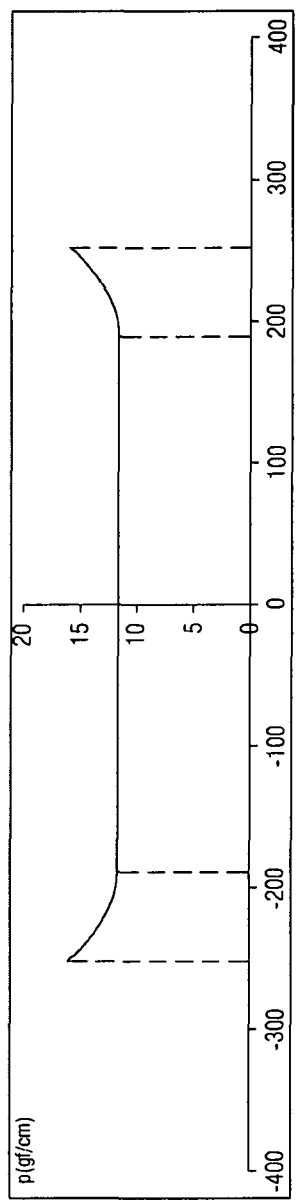
[FIG. 19]

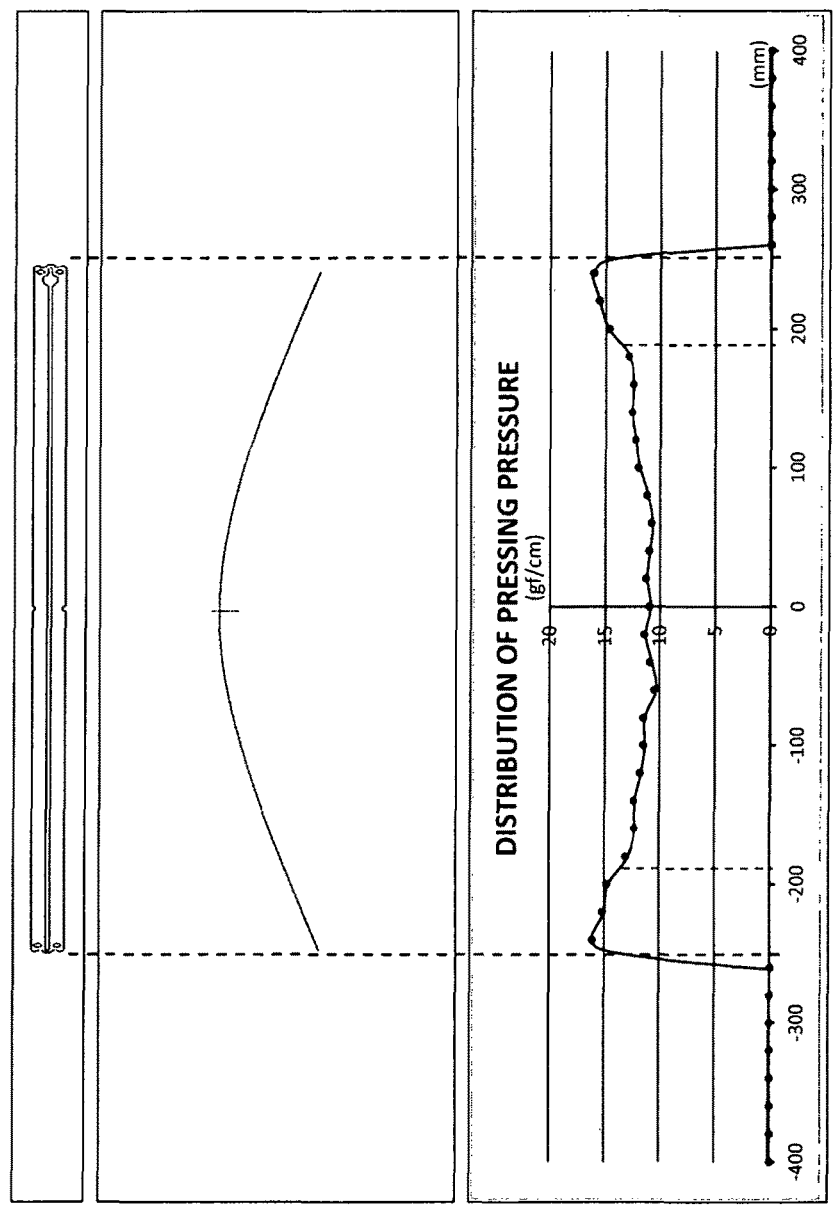
[FIG. 20]

WIPER BLADE ASSEMBLY

This application claims the benefit of Korean Patent Application No. 10-2016-0158519, filed on Nov. 25, 2016, in the Korean Intellectual Property Office, the disclosure of which is incorporated herein by reference in its entirety.

BACKGROUND

1. Field

The present inventive concept relates to a wiper blade assembly, and more particularly, to a wiper blade assembly which can control the distribution of the pressing pressure of an elastic member and the distribution of the contact force of a contact member.

2. Description of the Related Art

A wiper blade assembly wipes rain or dirt from a vehicle's windshield to ensure the driver's view. The wiper blade assembly is connected to a wiper arm which is connected to a drive shaft connected to a wiper driving motor of the vehicle. Thus, the wiper blade assembly is driven by the wiper arm.

The wiper arm and the wiper blade assembly are coupled to each other by a wiper connector. Generally, a member called a clamp is provided in the wiper blade assembly, and a connector member is coupled to the clamp. In a state where the connector member is coupled to the clamp, the wiper arm is coupled to the connector member.

Wiper blade assemblies are broadly divided into a conventional type and a flat type according to the structure of a blade.

A general wiper blade assembly includes a contact member which removes foreign matter attached to a window, an elastic member which supports the contact member, and a cover member which covers the elastic member and extends in a lengthwise direction of the elastic member.

In addition, the general wiper blade assembly includes a coupling cover which is coupled to the elastic member. The coupling cover may include a structure that can be coupled to an adapter.

In the general wiper blade assembly, the wiper arm is coupled to a connector member of the wiper blade assembly, and the wiper blade assembly is made to perform a wiping function by the driving force of the wiper arm as described above.

In this case, the wiper arm presses the wiper blade assembly with a certain force, and the wiper blade assembly is pressed against the windshield of a vehicle by the force.

That is, to improve wiping characteristics of the wiper blade assembly, contact characteristics between the wiper blade assembly and the windshield of the vehicle should be superior. To this end, it is important to control the distribution of pressing pressure applied to the elastic member of the wiper blade assembly.

SUMMARY

Aspects of the inventive concept provide a wiper blade assembly which can control the distribution of the pressing pressure of an elastic member and the distribution of the contact force of a contact member.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a wiper blade assembly including: a contact member; and an elastic member which supports the contact member, wherein the elastic member includes a body and a central portion which is located in a central area of the body, wherein the body includes a first body portion which extends from the central portion in a first direction, a first end which is located at an end of the first body portion, a second body portion which extends from the central portion in a second direction, and a second end which is located at an end of the second body portion, wherein the body includes a first point which is located between the central portion and the first end and a second point which is located between the central portion and the second end, wherein first pressing pressure is evenly distributed in an area from the first point to the second point, pressing pressure in an area from the first point to the first end is greater than the first pressing pressure, and pressing pressure in an area from the second point to the second end is greater than the first pressing pressure.

The first point may be any one of ⅓ through ¾ points of the first body portion from the central portion, and the second point may be any one of ⅓ through ¾ points of the second body portion from the central portion.

In addition, the first point and the second point may be symmetrical to each other with respect to the central portion.

In addition, the even distribution of the first pressing pressure may include a change in pressing pressure within an error range of ±1.5 gf/cm from a specific constant.

In addition, when the pressing pressure in the area from the first point to the first end is greater than the first pressing pressure and when the pressing pressure in the area from the second point to the second end is greater than the first pressing pressure, a maximum value of the pressing pressure in the area from the first point to the first end and a maximum value of the pressing pressure in the area from the second point to the second end may be greater than the first pressing pressure by a range of +4 to +6 gf/cm.

BRIEF DESCRIPTION OF THE DRAWINGS

These and/or other aspects will become apparent and more readily appreciated from the following description of the embodiments, taken in conjunction with the accompanying drawings in which:

FIG. 1 is a coupled perspective view of a wiper blade assembly according to the inventive concept;

FIG. 2 is an exploded perspective view of the wiper blade assembly according to the inventive concept;

FIG. 3A is a perspective view of an elastic member according to the inventive concept;

FIG. 3B is a plan view of the elastic member according to the inventive concept;

FIG. 4A is a perspective view of a contact member according to the inventive concept;

FIG. 4B is a plan view of the contact member according to the inventive concept;

FIG. 5 is a schematic diagram illustrating the curvatures of general elastic members;

FIG. 6 illustrates the change in curvature with respect to the length of an elastic member;

FIG. 7 illustrates the distribution of the pressing pressure of an elastic member according to an embodiment, FIG. 8 illustrates the distribution of the pressing pressure of an elastic member according to an embodiment, FIG. 9 illustrates the distribution of the pressing pressure of an elastic member according to an embodiment, and FIG. 10 illustrates the distribution of the pressing pressure of an elastic member according to an embodiment, wherein the theoretical distributions of the pressing pressure of the elastic members are illustrated in FIGS. 7 through 10;

FIG. 11 illustrates the distribution of the pressing pressure of an elastic member according to an embodiment, FIG. 12 illustrates the distribution of the pressing pressure of an elastic member according to an embodiment, FIG. 13 illustrates the distribution of the pressing pressure of an elastic member according to an embodiment, and FIG. 14 illustrates the distribution of the pressing pressure of an elastic member according to an embodiment, wherein the measured distributions of the pressing pressure of the elastic members are illustrated in FIGS. 11 through 14;

FIG. 15 illustrates the distribution of the pressing pressure of an elastic member according to an embodiment, wherein the theoretical distribution of the pressing pressure of the elastic member is illustrated in FIG. 15;

FIG. 16 illustrates the distribution of the pressing pressure of an elastic member according to an embodiment, wherein the measured distribution of the pressing pressure of the elastic member is illustrated in FIG. 16;

FIG. 17 illustrates the distribution of the pressing pressure of an elastic member according to an embodiment, wherein the theoretical distribution of the pressing pressure of the elastic member is illustrated in FIG. 17;

FIG. 18 illustrates the distribution of the pressing pressure of an elastic member according to an embodiment, wherein the measured distribution of the pressing pressure of the elastic member is illustrated in FIG. 18;

FIG. 19 illustrates the distribution of the pressing pressure of an elastic member according to an embodiment, wherein the theoretical distribution of the pressing pressure of the elastic member is illustrated in FIG. 19; and FIG. 20 illustrates the distribution of the pressing pressure of an elastic member according to an embodiment, wherein the measured distribution of the pressing pressure of the elastic member is illustrated in FIG. 20.

DETAILED DESCRIPTION

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims.

Specific embodiments of the inventive concept will be described in detail with reference to the accompanying drawings. Like reference numerals refer to like components regardless of the drawings. As used herein, the term "and/or" includes any and all combinations of one or more of the associated listed items.

It will be understood that, although the terms first, second, third, etc., may be used herein to describe various components, these components should not be limited by these terms. These terms are only used to distinguish one component from another component. Thus, a first component discussed below could be termed a second component without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated components, but do not preclude the presence or addition of one or more other components.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below," "beneath," "lower," "above," "upper" and the like, may be used herein for ease of description to describe the relationship of one component or feature to another component(s) or feature(s) as illustrated in the figures. It will be understood that the spatially relative terms are intended to encompass different orientations of the device in use or operation, in addition to the orientation depicted in the figures. For example, if the device in the figures is turned over, components described as "below" or "beneath" other components or features would then be oriented "above" the other components or features. Thus, the exemplary term "below" or "beneath" can encompass both an orientation of above and below or beneath. The component may be otherwise oriented and the spatially relative descriptors used herein interpreted accordingly.

Hereinafter, exemplary embodiments of the inventive concept will be described in detail with reference to the accompanying drawings.

FIG. 1 is a coupled perspective view of a wiper blade assembly 100 according to the inventive concept. FIG. 2 is an exploded perspective view of the wiper blade assembly 100 according to the inventive concept.

Referring to FIGS. 1 and 2, the wiper blade assembly 100 according to the inventive concept includes a rubber contact member 600 which contacts the windshield of a vehicle, an elastic member 700 which supports the contact member 600, and a wiper arm coupling unit 400 which is located in a specific area of the elastic member 700 in a lengthwise direction of the elastic member 700 and to which a wiper arm is coupled.

Here, the wiper arm coupling unit 400 may include a coupling cover 200 which is located in a specific area of the elastic member 700 in the lengthwise direction of the elastic member 700 and includes a housing part and an adapter 300 which can be attached to or detached from the housing part of the coupling cover 200.

Although not illustrated in the drawings, the wiper arm may be coupled to various forms of connectors (not illustrated). Here, the wiper arm may be coupled to the adapter 300 or the connectors (not illustrated). Since this is obvious to those of ordinary skill in the art to which the inventive concept pertains, it will now be described in detail.

Although not illustrated in the drawings, the wiper arm may be coupled to the adapter 300 or the connectors (not shown) as described above. Therefore, the wiper blade assembly 100 may be driven by the power transmitted from the wiper arm.

As illustrated in the drawings, the wiper arm coupling unit 400 may be located in a central area of the elastic member 700 in the lengthwise direction of the elastic member 700.

Accordingly, the coupling cover 200 may be located in the central area of the elastic member 700 in the lengthwise direction of the elastic member 700. In addition, the adapter 300 attached to the housing part of the coupling cover 200 may be located in the central area of the elastic member 700 in the lengthwise direction of the elastic member 700.

Since the wiper arm coupling unit 400 coupled to the wiper arm is located in the central area of the elastic member 700 in the lengthwise direction of the elastic member 700, the wiper arm presses the elastic member 700 in the central area of the elastic member 700 in the lengthwise direction of the elastic member 700.

The force with which the wiper arm presses the elastic member 700 will be defined herein as an applied force.

Here, when the elastic member 700 is pressed by the applied force of the wiper arm, certain pressure is generated in the elastic member 700.

The pressure generated in the elastic member 700 by the applied force of the wiper arm will be defined herein as pressing pressure.

The pressing pressure generated in the elastic member 700 is transmitted to the contact member 600 to generate certain pressure in the contact member 600. Accordingly, the contact member 600 presses the windshield surface of the vehicle.

The force with which the contact member 600 presses the windshield surface of the vehicle will be defined herein as a contact force.

That is, in the inventive concept, the applied force with which the wiper arm presses the elastic member 700 generates the pressing pressure in the elastic member 700, and the pressing pressure of the elastic member 700 generates the contact force that causes the contact member 600 to press the windshield surface of the vehicle.

The inventive concept aims to achieve more superior wiping characteristics by controlling the distribution of the pressing pressure and the contact force.

Although not illustrated in the drawings, the wiper blade assembly 100 according to the inventive concept may further include a pair of cover members (not illustrated, generally referred to as spoilers) into which the elastic member 700 is inserted. The cover members are optional.

FIG. 3A is a perspective view of an elastic member 700 according to the inventive concept. FIG. 3B is a plan view of the elastic member 700 according to the inventive concept.

Areas of the elastic member 700 according to the inventive concept will be defined below with reference to FIGS. 3A and 3B.

Referring to FIGS. 3A and 3B, the elastic member 700 according to the inventive concept includes a body and a central portion 710 which is located in a central area of the body.

The body includes a first body portion which extends from the central portion 710 in a first direction and a first end 720a which is located at an end of the first body portion.

In addition, the body includes a second body portion which extends from the central portion 710 in a second direction and a second end 720b which is located at an end of the second body portion.

That is, the elastic member 700 according to the inventive concept may be defined as the central portion 710, the first and second ends 720a and 720b which are respectively located at both ends with respect to the central portion 710, and the first and second body portions which are respectively located between the central portion 710 and the first and second ends 720a and 720b.

Based on the above definition, referring to FIG. 3B, the elastic member 700 may include an elastic member area A, and the elastic member area A may include a first elastic member area A1 and a second elastic member area A2. Here, an area extending from the central portion 710 to the first end 720a may be defined as the first elastic member area A1, and an area extending from the central portion 710 to the second end 720b may be defined as the second elastic member area A2.

Referring continuously to FIG. 3B, in the first elastic member area A1, a point located at half a length from the central portion 710 to the first end 720a, that is, a point located at half a length of the first body portion may be defined as a central point 730a of the first body portion. In this case, the first elastic member area A1 includes a ½ area C1 of the first body portion which is an area extending from the central portion 710 to the central point 730a of the first body portion.

In addition, in the second elastic member area A2, a point located at half a length from the central portion 710 to the second end 720b, that is, a point located at half a length of the second body portion may be defined as a central point 730b of the second body portion. In this case, the second elastic member area A2 includes a ½ area C2 of the second body portion which is an area extending from the central portion 710 to the central point 730b of the second body portion.

Here, when based on the elastic member area A, the ½ area C1 of the first body portion and the ½ area C2 of the second body portion may be defined as a ½ area C of the body.

That is, the ½ area C of the body may be defined as an area extending from the central point 730a of the first body portion to the central point 730b of the second body portion via the central portion 710.

Referring continuously to FIG. 3B, in the first elastic member area A1, a point located at two thirds of the length from the central portion 710 to the first end 720a, that is, a point located at two thirds of the length of the first body portion may be defined as a ⅔ point 740a of the first body portion. In this case, the first elastic member area A1 includes a ⅔ area B1 of the first body portion which is an area extending from the central portion 710 to the ⅔ point 740a of the first body portion.

In addition, in the second elastic member area A2, a point located at two thirds of the length from the central portion 710 to the second end 720b, that is, a point located at two thirds of the length of the second body portion may be defined as a ⅔ point 740b of the second body portion. In this case, the second elastic member area A2 includes a ⅔ area B2 of the second body portion which is an area extending from the central portion 710 to the ⅔ point 740b of the second body portion.

Here, when based on the elastic member area A, the ⅔ area B1 of the first body portion and the ⅔ area B2 of the second body portion may be defined as a ⅔ area B of the body.

That is, the ⅔ area B of the body may be defined as an area extending from the ⅔ point 740a of the first body portion to the ⅔ point 740b of the second body portion via the central portion 710.

Referring continuously to FIG. 3B, in the first elastic member area A1, a point located at one third of the length from the central portion 710 to the first end 720a, that is, a point located at one third of the length of the first body portion may be defined as a ⅓ point 750a of the first body portion. In this case, the first elastic member area A1 includes a ⅓ area D1 of the first body portion which is an area extending from the central portion 710 to the ⅓ point 750a of the first body portion.

In addition, in the second elastic member area A2, a point located at one third of the length from the central portion 710 to the second end 720b, that is, a point located at one third of the length of the second body portion may be defined as a ⅓ point 750b of the second body portion. In this case, the second elastic member area A2 includes a ⅓ area D2 of the second body portion which is an area extending from the central portion 710 to the ⅓ point 750b of the second body portion.

Here, when based on the elastic member area A, the ⅓ area D1 of the first body portion and the ⅓ area D2 of the second body portion may be defined as a ⅓ area D of the body.

That is, the ⅓ area D of the body may be defined as an area extending from the ⅓ point 750a of the first body portion to the ⅓ point 750b of the second body portion via the central portion 710.

Referring continuously to FIG. 3B, in the first elastic member area A1, a point located at three fourths of the length from the central portion 710 to the first end 720a, that is, a point located at three fourths of the length of the first body portion may be defined as a ¾ point 760a of the first body portion. In this case, the first elastic member area A1 includes a ¾ area E1 of the first body portion which is an area extending from the central portion 710 to the ¾ point 760a of the first body portion.

In addition, in the second elastic member area A2, a point located at three fourths of the length from the central portion 710 to the second end 720b, that is, a point located at three fourths of the length of the second body portion may be defined as a ¾ point 760b of the second body portion. In this case, the second elastic member area A2 includes a ¾ area E2 of the second body portion which is an area extending from the central portion 710 to the ¾ point 760b of the second body portion.

Here, when based on the elastic member area A, the ¾ area E1 of the first body portion and the ¾ area E2 of the second body portion may be defined as a ¾ area E of the body.

That is, the ¾ area E of the body may be defined as an area extending from the ¾ point 760a of the first body portion to the ¾ point 760b of the second body portion via the central portion 710.

Based on the above definition of the areas of the elastic member 700, the pressing pressure of the elastic member 700 according to the inventive concept will be described below.

As described above, when the elastic member 700 is pressed by the applied force of the wiper arm, certain pressure is generated in the elastic member 700. The pressure generated in the elastic member 700 by the applied force of the wiper arm was defined above as the pressing pressure.

In the inventive concept, the distribution of the pressing pressure of the elastic member 700 is as follows.

For example, in the inventive concept, the pressing pressure is constant in the ½ area C of the body of the elastic member 700 but increases in an area other than the ½ area C of the body.

Here, since the ½ area C of the body is defined as an area extending from the central point 730a of the first body portion to the central point 730b of the second body portion via the central portion 710, the area other than the ½ area C of the body may be defined as an area extending from the central point 730a of the first body portion to the first end 720a and an area extending from the central point 730b of the second body portion to the second end 720b.

In addition, in the inventive concept, the pressing pressure is constant in the ⅔ area B of the body of the elastic member 700 but increases in an area other than the ⅔ area B of the body.

That is, since the ⅔ area B of the body is defined as an area extending from the ⅔ point 740a of the first body portion to the ⅔ point 740b of the second body portion via the central portion 710, the area other than the ⅔ area B of the body may be defined as an area extending from the ⅔ point 740a of the first body portion to the first end 720a and an area extending from the ⅔ point 740b of the second body portion to the second end 720b.

By the same logic, in the inventive concept, the pressing pressure is constant in the ⅓ area D of the body of the elastic member 700 but increases in an area other than the ⅓ area D of the body.

In addition, in the inventive concept, the pressing pressure is constant in the ¾ area E of the body of the elastic member 700 but increases in an area other than the ¾ area E of the body.

This can be summarized as follows.

That is, a wiper blade assembly according to the inventive concept includes a contact member and an elastic member which supports the contact member, and the elastic member includes a body and a central portion which is located in a central area of the body.

In addition, the body includes a first body portion which extends from the central portion in a first direction, a first end which is located at an end of the first body portion, a second body portion which extends from the central portion in a second direction, and a second end which is located at an end of the second body portion. The body includes a first point which is located between the central portion and the first end and a second point which is located between the central portion and the second end.

In the inventive concept, first pressing pressure is evenly distributed in an area from the first point to the second point, pressing pressure in an area from the first point to the first end is greater than the first pressing pressure, and pressing pressure in an area from the second point to the second end is greater than the first pressing pressure.

Here, the first pressing pressure may be a constant of any one of 9 to 14 gf/cm. That is, the pressing pressure of the elastic member of the wiper blade assembly may be designed to be set to a value of any one of 9 to 14 gf/cm in a section in which the pressing pressure is distributed evenly.

As described above, the first point may be a ½ point of the first body portion from the central portion, and the second point may be a ½ point of the second body portion from the central portion.

In addition, the first point may be a ⅔ point of the first body portion from the central portion, and the second point may be a ⅔ point of the second body portion from the central portion.

In addition, the first point may be a ⅓ point of the first body portion from the central portion, and the second point may be a ⅓ point of the second body portion from the central portion.

In addition, the first point may be a ¾ point of the first body portion from the central portion, and the second point may be a ¾0 point of the second body portion from the central portion.

Therefore, in the inventive concept, the first point may be any one of the ⅓ through ¾ points of the first body portion from the central portion, and the second point may be any one of the ⅓ through ¾ points of the second body portion from the central portion.

Ultimately, in the inventive concept, the first pressing pressure is evenly distributed in the area from the first point to the second point, and the pressing pressure in the other area, that is, the pressing pressure in the area from the first point to the first end and the pressing pressure in the area from the second point to the second end are greater than the first pressing pressure.

Such a difference in pressing pressure will be described later.

Areas of the contact member may also be defined in the same way as the areas of the elastic member are defined.

FIG. 4A is a perspective view of a contact member 600 according to the inventive concept. FIG. 4B is a plan view of the contact member 600 according to the inventive concept. More specifically, referring to FIGS. 4A and 4B, the contact member 600 includes a body and a central portion 610 which is located in a central area of the body. The body includes a first body portion which extends from the central portion 610 in a first direction and a first end 620a which is located at an end of the first body portion.

In addition, the body includes a second body portion which extends from the central portion 610 in a second direction and a second end 620b which is located at an end of the second body portion.

That is, the contact member 600 according to the inventive concept may be defined as the central portion 610, the first and second ends 620a and 620b which are respectively located at both ends with respect to the central portion 610, and the first and second body portions which are respectively located between the central portion 610 and the first and second ends 620a and 620b.

For ease of description, the mark ' will be added to each area of the contact member 600 which corresponds to each area of the elastic member 700.

That is, area A of the elastic member 700 corresponds to area A' of the contact member 600.

The contact member 600 according to the inventive concept may include a contact member area A', and the contact member area A' may include a first contact member area A1' and a second contact member area A2'. Here, an area extending from the central portion 610 to the first end 620a may be defined as the first contact member area A1', and an area extending from the central portion 610 to the second end 620b may be defined as the second contact member area A2'.

In addition, in the first contact member area A1', a point located at half a length from the central portion 610 to the first end 620a, that is, a point located at half a length of the first body portion may be defined as a central point 630a of the first body portion. In this case, the first contact member area A1' includes a ½ area C1' of the first body portion which is an area extending from the central portion 610 to the central point 630a of the first body portion.

In addition, in the second contact member area A2', a point located at half a length from the central portion 610 to the second end 620b, that is, a point located at half a length of the second body portion may be defined as a central point 630b of the second body portion. In this case, the second contact member area A2' includes a ½ area C2' of the second body portion which is an area extending from the central portion 610 to the central point 630b of the second body portion. Here, when based on the contact member area A', the ½ area C1' of the first body portion and the ½ area C2' of the second body portion may be defined as a ½ area C' of the body.

That is, the ½ area C' of the body may be defined as an area extending from the central point 630a of the first body portion to the central point 630b of the second body portion via the central portion 610.

In addition, in the first contact member area A1', a point located at two thirds of the length from the central portion 610 to the first end 620a, that is, a point located at two thirds of the length of the first body portion may be defined as a ⅔ point 640a of the first body portion. In this case, the first contact member area A1' includes a ⅔ area B 1' of the first body portion which is an area extending from the central portion 610 to the ⅔ point 640a of the first body portion.

In addition, in the second contact member area A2', a point located at two thirds of the length from the central portion 610 to the second end 620b, that is, a point located at two thirds of the length of the second body portion may be defined as a ⅔ point 640b of the second body portion. In this case, the second contact member area A2' includes a ⅔ area B2' of the second body portion which is an area extending from the central portion 610 to the ⅔ point 640b of the second body portion.

Here, when based on the contact member area A', the ⅔ area B 1' of the first body portion and the ⅔ area B2' of the second body portion may be defined as a ⅔ area B' of the body.

That is, the ⅔ area B' of the body may be defined as an area extending from the ⅔ point 640a of the first body portion to the ⅔ point 640b of the second body portion via the central portion 610.

In addition, in the first contact member area A1', a point located at one third of the length from the central portion 610 to the first end 620a, that is, a point located at one third of the length of the first body portion may be defined as a ⅓ point 650a of the first body portion. In this case, the first contact member area A1' includes a ⅓ area D1' of the first body portion which is an area extending from the central portion 610 to the ⅓ point 650a of the first body portion.

In addition, in the second contact member area A2', a point located at one third of the length from the central portion 610 to the second end 620b, that is, a point located at one third of the length of the second body portion may be defined as a ⅓ point 650b of the second body portion. In this case, the second contact member area A2' includes a ⅓ area D2' of the second body portion which is an area extending from the central portion 610 to the ⅓ point 650b of the second body portion.

Here, when based on the contact member area A', the ⅓ area D1' of the first body portion and the ⅓ area D2' of the second body portion may be defined as a ⅓ area D' of the body.

That is, the ⅓ area D' of the body may be defined as an area extending from the ⅓ point 650a of the first body portion to the ⅓ point 650b of the second body portion via the central portion 610.

In addition, in the first contact member area A1', a point located at three fourths of the length from the central portion 610 to the first end 620a, that is, a point located at three fourths of the length of the first body portion may be defined as a ¾ point 660a of the first body portion. In this case, the first contact member area A1' includes a ¾ area E1' of the first body portion which is an area extending from the central portion 610 to the ¾ point 660a of the first body portion.

In addition, in the second contact member area A2', a point located at three fourths of the length from the central portion 610 to the second end 620b, that is, a point located at three fourths of the length of the second body portion may be defined as a ¾ point 660b of the second body portion. In this case, the second contact member area A2' includes a ¾ area E2' of the second body portion which is an area extending from the central portion 610 to the ¾ point 660b of the second body portion.

Here, when based on the contact member area A', the ¾ area E1' of the first body portion and the ¾ area E2' of the second body portion may be defined as a ¾ area E' of the body.

That is, the ¾ area E' of the body may be defined as an area extending from the ¾ point 660a of the first body portion to the ¾ point 660b of the second body portion via the central portion 610.

Based on the above definition of the areas of the contact member 600, the contact pressure of the contact member 600 according to the inventive concept will be described below.

As described above, the pressing pressure generated in the elastic member 700 is transmitted to the contact member 600 to generate certain pressure in the contact member 600. The pressure generated in the contact member 600 causes the contact member 600 to press the windshield surface of a vehicle. In the inventive concept, the force with which the contact member 600 presses the windshield surface of the vehicle was defined above as a contact force.

That is, in the inventive concept, the applied force with which the wiper arm presses the elastic member 700 generates the pressing pressure in the elastic member 700, and the pressing pressure of the elastic member 700 generates the contact force with which the contact member 600 presses the windshield surface of the vehicle.

In the inventive concept, the distribution of the contact force of the contact member 600 is as follows.

That is, a wiper blade assembly according to the inventive concept includes a contact member and an elastic member which supports the contact member, and the elastic member includes a body and a central portion which is located in a central area of the body.

The body includes a first body portion which extends from the central portion in a first direction, a first end which is located at an end of the first body portion, a second body portion which extends from the central portion in a second direction, and a second end which is located at an end of the second body portion. In addition, the body includes a first point which is located between the central portion and the first end and a second point which is located between the central portion and the second end.

In the inventive concept, a first contact force is evenly distributed in an area from the first point to the second point, a contact force in an area from the first point to the first end is greater than the first contact force, and a contact force in an area from the second point to the second end is greater than the first contact force.

As described above, the first point may be a ½ point of the first body portion from the central portion, and the second point may be a ½ point of the second body portion from the central portion.

In addition, the first point may be a ⅔ point of the first body portion from the central portion, and the second point may be a ⅔ point of the second body portion from the central portion.

In addition, the first point may be a ⅓ point of the first body portion from the central portion, and the second point may be a ⅓ point of the second body portion from the central portion.

In addition, the first point may be a ¾ point of the first body portion from the central portion, and the second point may be a ¾ point of the second body portion from the central portion.

Therefore, in the inventive concept, the first point may be any one of the ⅓ through ¾ points of the first body portion from the central portion, and the second point may be any one of the ⅓ through ¾ points of the second body portion from the central portion.

Ultimately, in the inventive concept, the first contact force is evenly distributed in the area from the first point to the second point, and a contact force in the other area, that is, a contact force in the area from the first point to the first end and a contact force in the area from the second point to the second end are greater than the first contact force. FIG. 5 is a schematic diagram illustrating the curvatures of general elastic members. FIG. 6 illustrates the change in curvature with respect to the length of an elastic member.

Referring to FIG. 5, an elastic member may not have a curvature as in the case of X but may also include different curvatures as in the cases of Y and Z.

Wiper blade assemblies may be broadly divided into a conventional type and a flat type according to the structure of a blade. A flat type wiper blade assembly generally includes an elastic member having a curvature.

The elastic member of the flat type wiper blade assembly includes a curvature to control the distribution of pressing pressure applied by a wiper arm. The curvature may generally vary according to the length of the elastic member.

FIG. 6 illustrates the change in curvature applied to an elastic member with respect to the length of the elastic member.

Table 1 below shows a k value for each inch. Here, k=1/R, where R is a curvature of a central portion of an elastic member.

TABLE 1

| Inch | K |
|---|---|
| 14 | 0.00201 |
| 15 | 0.00227 |
| 16 | 0.00254 |
| 17 | 0.00284 |
| 18 | 0.00315 |
| 19 | 0.00347 |
| 20 | 0.00382 |
| 21 | 0.00418 |
| 22 | 0.00456 |
| 24 | 0.00537 |
| 26 | 0.00626 |
| 28 | 0.00721 |

That is, in the inventive concept, the above k value may be provided for each inch. However, the above k value for each inch is merely an example.

Hereinafter, the inventive concept will be described in detail by way of experimental examples. However, the inventive concept is not limited to the experimental examples.

FIG. 7 illustrates the distribution of the pressing pressure of an elastic member according to an embodiment. FIG. 8 illustrates the distribution of the pressing pressure of an elastic member according to an embodiment. FIG. 9 illustrates the distribution of the pressing pressure of an elastic member according to an embodiment. FIG. 10 illustrates the distribution of the pressing pressure of an elastic member according to an embodiment. The theoretical distributions of the pressing pressure of the elastic members are illustrated in FIGS. 7 through 10.

The elastic member of FIG. 7 has a length of 16 inches (400 mm), and a k value for calculating a curvature R of a central portion of the elastic member is 0.00254.

In addition, the elastic member of FIG. 8 has a length of 20 inches (500 mm), and the k value for calculating the curvature R of a central portion of the elastic member is 0.00382.

In addition, the elastic member of FIG. 9 has a length of 24 inches (600 mm), and the k value for calculating the curvature R of a central portion of the elastic member is 0.00537.

In addition, the elastic member of FIG. 10 has a length of 28 inches (700 mm), and the k value for calculating the curvature R of a central portion of the elastic member is 0.00721.

As described above, in the inventive concept, the pressing pressure is constant in the ⅔ area B of the body of the elastic member but increases in an area other than the ⅔ area B of the body.

In each of the 16-, 20-, 24- and 28-inch elastic members illustrated in FIGS. 7 through 10, the pressing pressure is constant in the ⅔ area B of the body but increases in the area other than the ⅔ area B of the body.

That is, referring to FIG. 3B, since the ⅔ area B of the body is defined as an area extending from the ⅔ point 740a of the first body portion to the ⅔ point 740b of the second body portion via the central portion 710, the area other than the ⅔ area B of the body may be defined as an area extending from the ⅔ point 740a of the first body portion to the first end 720a and an area extending from the ⅔ point 740b of the second body portion to the second end 720b.

Here, when the pressing pressure is constant in the ⅔ area B of the body of the elastic member, it means that the same pressing pressure, e.g., a constant of 11.5 gf/cm is maintained over the entire ⅔ area B of the body. Even if the same pressing pressure is designed, however, there can be an error resulting from a manufacturing process. Therefore, a change in pressing pressure within an error range of ±1.5 gf/cm from the constant may be allowed.

That is, when the pressing pressure is constant in the ⅔ area B of the body of the elastic member, it means that a pressing pressure of a specific constant ±1.5 gf/cm is maintained over the entire ⅔ area B of the body.

In addition, when the pressing pressure increases in the area other than the ⅔ area B of the body, it means that the pressing pressure has a maximum value in the area other than the ⅔ area B of the body.

That is, when the pressing pressure increases in the area other than the ⅔ area B of the body, it means that the pressing pressure is greater in the area other than the ⅔ area B of the body than in the ⅔ area B of the body and that the maximum value of the pressing pressure in the area other than the ⅔ area B of the body is greater than the pressing pressure in the entire ⅔ area B of the body by a range of +4 to +6 gf/cm.

For example, assuming that the same pressing pressure, e.g., 11.5 gf/cm is designed to be maintained over the entire ⅔ area B of the body, the pressing pressure in the ⅔ area B of the body may be maintained at 11.5±1.5 gf/cm. Here, the pressing pressure in the area other than the ⅔ area B of the body may be greater than 11.5 gf/cm, but the maximum value of the pressing pressure in the area other than the ⅔ area B of the body may be set within a range of 15.5 to 17.5 gf/cm.

FIG. 11 illustrates the distribution of the pressing pressure of an elastic member according to an embodiment. FIG. 12 illustrates the distribution of the pressing pressure of an elastic member according to an embodiment. FIG. 13 illustrates the distribution of the pressing pressure of an elastic member according to an embodiment. FIG. 14 illustrates the distribution of the pressing pressure of an elastic member according to an embodiment. The measured distributions of the pressing pressure of the elastic members are illustrated in FIGS. 11 through 14.

The elastic member of FIG. 11 has a length of 16 inches (400 mm), and a k value for calculating a curvature R of a central portion of the elastic member is 0.00254.

In addition, the elastic member of FIG. 12 has a length of 20 inches (500 mm), and the k value for calculating the curvature R of a central portion of the elastic member is 0.00382.

In addition, the elastic member of FIG. 13 has a length of 24 inches (600 mm), and the k value for calculating the curvature R of a central portion of the elastic member is 0.00537.

In addition, the elastic member of FIG. 14 has a length of 28 inches (700 mm), and the k value for calculating the curvature R of a central portion of the elastic member is 0.00721.

As described above, in the inventive concept, the pressing pressure is constant in the ⅔ area B of the body of the elastic member but increases in an area other than the ⅔ area B of the body.

That is, when the pressing pressure is constant in the ⅔ area B of the body of the elastic member, it means that the same pressing pressure, e.g., a constant of 11.5 gf/cm is maintained over the entire ⅔ area B of the body. Even if the same pressing pressure is designed, however, there can be an error resulting from a manufacturing process. Therefore, a change in pressing pressure within an error range of ±1.5 gf/cm may be allowed.

Here, referring to FIGS. 11 through 14, it can be seen that a pressing pressure of a specific constant ±1.5 gf/cm is maintained over the entire ⅔ area B of the body.

In addition, when the pressing pressure increases in the area other than the ⅔ area B of the body, it means that the pressing pressure is greater in the area other than the ⅔ area B of the body than in the ⅔ area B of the body and that a maximum value of the pressing pressure in the area other than the ⅔ area B of the body is greater than the pressing pressure in the entire ⅔ area B of the body by a range of +4 to +6 gf/cm.

Here, referring to FIGS. 11 through 14, it can be seen that the pressing pressure is greater in the area other than the ⅔ area B of the body than in the ⅔ area B of the body and that the maximum value of the pressing pressure in the area other than the ⅔ area B of the body is greater than the pressing pressure (a constant of 11.5±1.5 gf/cm) in the entire ⅔ area B of the body by a range of +4 to +6 gf/cm.

FIG. 15 illustrates the distribution of the pressing pressure of an elastic member according to an embodiment. The theoretical distribution of the pressing pressure of the elastic member is illustrated in FIG. 15.

The elastic member of FIG. 15 has a length of 20 inches (500 mm), and a k value for calculating a curvature R of a central portion of the elastic member is 0.00382.

As described above, in the inventive concept, the pressing pressure is constant in the ½ area C of the body of the elastic member but increases in an area other than the ½ area C of the body.

Here, in the 20-inch elastic member illustrated in FIG. 15, the pressing pressure is constant in the ½ area C of the body but increases in the area other than the ½ area C of the body.

That is, referring to FIG. 3B, since the ½ area C of the body is defined as an area extending from the central point 730a of the first body portion to the central point 730b of the second body portion via the central portion 710, the area other than the ½ area C of the body may be defined as an area extending from the central point 730a of the first body portion to the first end 720a and an area extending from the central point 730b of the second body portion to the second end 720b.

Here, when the pressing pressure is constant in the ½ area C of the body of the elastic member, it means that the same pressing pressure, e.g., a constant of 11.5 gf/cm is maintained over the entire ½ area C of the body. Even if the same pressing pressure is designed, however, there can be an error resulting from a manufacturing process. Therefore, a change in pressing pressure within an error range of ±1.5 gf/cm may be allowed.

That is, when the pressing pressure is constant in the ½ area C of the body of the elastic member, it means that a pressing pressure of a specific constant ±1.5 gf/cm is maintained over the entire ½ area C of the body.

In addition, when the pressing pressure increases in the area other than the ½ area C of the body, it means that the pressing pressure is greater in the area other than the ½ area C of the body than in the ½ area C of the body and that a maximum value of the pressing pressure in the area other than the ½ area C of the body is greater than the pressing pressure in the entire ½ area C of the body by a range of +4 to +6 gf/cm.

For example, assuming that the same pressing pressure, e.g., 11.5 gf/cm is designed to be maintained over the entire ½ area C of the body, the pressing pressure in the ½ area C of the body may be maintained at 11.5±1.5 gf/cm. Here, the pressing pressure in the area other than the ½ area C of the body may be greater than 11.5 gf/cm, but the maximum value of the pressing pressure in the area other than the ½ area C of the body may be set within a range of 15.5 to 17.5 gf/cm.

FIG. 16 illustrates the distribution of the pressing pressure of an elastic member according to an embodiment. The measured distribution of the pressing pressure of the elastic member is illustrated in FIG. 16.

As described above, in the inventive concept, the pressing pressure is constant in the ½ area C of the body of the elastic member but increases in an area other than the ½ area C of the body.

That is, when the pressing pressure is constant in the ½ area C of the body of the elastic member, it means that the same pressing pressure, e.g., a constant of 11.5 gf/cm is maintained over the entire ½ area C of the body. Even if the same pressing pressure is designed, however, there can be an error resulting from a manufacturing process. Therefore, a change in pressing pressure within an error range of ±1.5 gf/cm may be allowed.

Here, referring to FIG. 16, it can be seen that a pressing pressure of a specific constant ±1.5 gf/cm is maintained over the entire ½ area C of the body.

In addition, when the pressing pressure increases in the area other than the ½ area C of the body, it means that the pressing pressure is greater in the area other than the ½ area C of the body than in the ½ area C of the body and that a maximum value of the pressing pressure in the area other than the ½ area C of the body is greater than the pressing pressure (a constant of 11.5±1.5 gf/cm) in the entire ½ area C of the body by a range of +4 to +6 gf/cm.

Here, referring to FIG. 16, it can be seen that the pressing pressure is greater in the area other than the ½ area C of the body than in the ½ area C of the body and that the maximum value of the pressing pressure in the area other than the ½ area C of the body is greater than the pressing pressure (a constant of 11.5±1.5 gf/cm) in the entire ½ area C of the body by a range of +4 to +6 gf/cm.

FIG. 17 illustrates the distribution of the pressing pressure of an elastic member according to an embodiment. The theoretical distribution of the pressing pressure of the elastic member is illustrated in FIG. 17.

The elastic member of FIG. 17 has a length of 20 inches (500 mm), and a k value for calculating a curvature R of a central portion of the elastic member is 0.00382.

In the inventive concept, the pressing pressure is constant in the ⅓ area D of the body of the elastic member but increases in an area other than the ⅓ area D of the body.

Here, in the 20-inch elastic member illustrated in FIG. 17, the pressing pressure is constant in the ⅓ area D of the body but increases in the area other than the ⅓ area D of the body.

That is, referring to FIG. 3B, since the ⅓ area D of the body is defined as an area extending from the ⅓ point 750a of the first body portion to the ⅓ point 750b of the second body portion via the central portion 710, the area other than the ⅓ area D of the body may be defined as an area extending from the ⅓ point 750a of the first body portion to the first end 720a and an area extending from the ⅓ point 750b of the second body portion to the second end 720b.

Here, when the pressing pressure is constant in the ⅓ area D of the body of the elastic member, it means that the same pressing pressure, e.g., a constant of 11.5 gf/cm is maintained over the entire ⅓ area D of the body. Even if the same pressing pressure is designed, however, there can be an error resulting from a manufacturing process. Therefore, a change in pressing pressure within an error range of ±1.5 gf/cm may be allowed.

That is, when the pressing pressure is constant in the ⅓ area D of the body of the elastic member, it means that a pressing pressure of a specific constant ±1.5 gf/cm is maintained over the entire ⅓ area D of the body.

In addition, when the pressing pressure increases in the area other than the ⅓ area D of the body, it means that the pressing pressure is greater in the area other than the ⅓ area D of the body than in the ⅓ area D of the body and that a maximum value of the pressing pressure in the area other than the ⅓ area D of the body is greater than the pressing pressure in the entire ⅓ area D of the body by a range of +4 to +6 gf/cm.

For example, assuming that the same pressing pressure, e.g., 11.5 gf/cm is designed to be maintained over the entire ⅓ area D of the body, the pressing pressure in the ⅓ area D of the body may be maintained at 11.5±1.5 gf/cm. Here, the pressing pressure in the area other than the ⅓ area D of the body may be greater than 11.5 gf/cm, but the maximum value of the pressing pressure in the area other than the ⅓ area D of the body may be set within a range of 15.5 to 17.5 gf/cm.

FIG. 18 illustrates the distribution of the pressing pressure of an elastic member according to an embodiment. The measured distribution of the pressing pressure of the elastic member is illustrated in FIG. 18.

As described above, in the inventive concept, the pressing pressure is constant in the ⅓ area D of the body of the elastic member but increases in an area other than the ⅓ area D of the body.

As described above, when the pressing pressure is constant in the ⅓ area D of the body of the elastic member, it means that the same pressing pressure, e.g., a constant of 11.5 gf/cm is maintained over the entire ⅓ area D of the body. Even if the same pressing pressure is designed, however, there can be an error resulting from a manufacturing process. Therefore, a change in pressing pressure within an error range of ±1.5 gf/cm may be allowed.

Here, referring to FIG. 18, it can be seen that a pressing pressure of a specific constant ±1.5 gf/cm is maintained over the entire ⅓ area D of the body.

In addition, when the pressing pressure increases in the area other than the ⅓ area D of the body, it means that the pressing pressure is greater in the area other than the ⅓ area D of the body than in the ⅓ area D of the body and that a maximum value of the pressing pressure in the area other than the ⅓ area D of the body is greater than the pressing pressure (a constant of 11.5±1.5 gf/cm) in the entire ⅓ area D of the body by a range of +4 to +6 gf/cm.

Here, referring to FIG. 18, it can be seen that the pressing pressure is greater in the area other than the ⅓ area D of the body than in the ⅓ area D of the body and that the maximum value of the pressing pressure in the area other than the ⅓ area D of the body is greater than the pressing pressure (a constant of 11.5±1.5 gf/cm) in the entire ⅓ area D of the body by a range of +4 to +6 gf/cm.

FIG. 19 illustrates the distribution of the pressing pressure of an elastic member according to an embodiment. The theoretical distribution of the pressing pressure of the elastic member is illustrated in FIG. 19.

The elastic member of FIG. 19 has a length of 20 inches (500 mm), and a k value for calculating a curvature R of a central portion of the elastic member is 0.00382.

In the inventive concept, the pressing pressure is constant in the ¾ area E of the body of the elastic member but increases in an area other than the ¾ area E of the body.

Here, in the 20-inch elastic member illustrated in FIG. 19, the pressing pressure is constant in the ¾ area E of the body but increases in the area other than the ¾ area E of the body.

That is, referring to FIG. 3B, since the ¾ area E of the body is defined as an area extending from the ¾ point 760a *of the first body portion to the* ¾ point 760b of the second body portion via the central portion 710, the area other than the ¾ area E of the body may be defined as an area extending from the ¾ point 760a of the first body portion to the first end 720a and an area extending from the ¾ point 760b of the second body portion to the second end 720b.

Here, when the pressing pressure is constant in the ¾ area E of the body of the elastic member, it means that the same pressing pressure, e.g., a constant of 11.5 gf/cm is maintained over the entire ¾ area E of the body. Even if the same pressing pressure is designed, however, there can be an error resulting from a manufacturing process. Therefore, a change in pressing pressure within an error range of ±1.5 gf/cm may be allowed.

That is, when the pressing pressure is constant in the ¾ area E of the body of the elastic member, it means that a pressing pressure of a specific constant ±1.5 gf/cm is maintained over the entire ¾ area E of the body.

In addition, when the pressing pressure increases in the area other than the ¾ area E of the body, it means that the pressing pressure is greater in the area other than the ¾ area E of the body than in the ¾ area E of the body and that a maximum value of the pressing pressure in the area other than the ¾ area E of the body is greater than the pressing pressure in the entire ¾ area E of the body by a range of +4 to +6 gf/cm.

For example, assuming that the same pressing pressure, e.g., 11.5 gf/cm is designed to be maintained over the entire ¾ area E of the body, the pressing pressure in the ¾ area E of the body may be maintained at 11.5±1.5 gf/cm. Here, the pressing pressure in the area other than the ¾ area E of the body may be greater than 11.5 gf/cm, but the maximum value of the pressing pressure in the area other than the ¾ area E of the body may be set within a range of 15.5 to 17.5 gf/cm.

FIG. 20 illustrates the distribution of the pressing pressure of an elastic member according to an embodiment. The measured distribution of the pressing pressure of the elastic member is illustrated in FIG. 20.

As described above, in the inventive concept, the pressing pressure is constant in the ¾ area E of the body of the elastic member but increases in an area other than the ¾ area E of the body.

As described above, when the pressing pressure is constant in the ¾ area E of the body of the elastic member, it means that the same pressing pressure, e.g., a constant of 11.5 gf/cm is maintained over the entire ¾ area E of the body. Even if the same pressing pressure is designed, however, there can be an error resulting from a manufacturing process. Therefore, a change in pressing pressure within an error range of ±1.5 gf/cm may be allowed.

Here, referring to FIG. 20, it can be seen that a pressing pressure of a specific constant ±1.5 gf/cm is maintained over the entire ¾ area E of the body.

In addition, when the pressing pressure increases in the area other than the ¾ area E of the body, it means that the pressing pressure is greater in the area other than the ¾ area E of the body than in the ¾ area E of the body and that a maximum value of the pressing pressure in the area other than the ¾ area E of the body is greater than the pressing pressure (a constant of 11.5±1.5 gf/cm) in the entire ¾ area E of the body by a range of +4 to +6 gf/cm.

Here, referring to FIG. 20, it can be seen that the pressing pressure is greater in the area other than the ¾ area E of the body than in the ¾ area E of the body and that the maximum value of the pressing pressure in the area other than the ¾ area E of the body is greater than the pressing pressure (a constant of 11.5±1.5 gf/cm) in the entire ¾ area E of the body by a range of +4 to +6 gf/cm.

As described above, a wiper blade assembly according to the inventive concept includes a contact member and an elastic member which supports the contact member, and the elastic member includes a body and a central portion which is located in a central area of the body.

The body includes a first body portion which extends from the central portion in a first direction, a first end which is located at an end of the first body portion, a second body portion which extends from the central portion in a second direction, and a second end which is located at an end of the second body portion. In addition, the body includes a first point which is located between the central portion and the first end and a second point which is located between the central portion and the second end.

In the inventive concept, first pressing pressure is evenly distributed in an area from the first point to the second point, pressing pressure in an area from the first point to the first end is greater than the first pressing pressure, and pressing pressure in an area from the second point to the second end is greater than the first pressing pressure.

In the inventive concept, the first point may be any one of ⅓ through ¾ points of the first body portion from the central portion, and the second point may be any one of ⅓ through ¾ points of the second body portion from the central portion.

Ultimately, in the inventive concept, the first pressing pressure is evenly distributed in the area from the first point to the second point, and the pressing pressure in the other area, that is, the pressing pressure in the area from the first point to the first end and the pressing pressure in the area from the second point to the second end are greater than the first pressing pressure.

In addition, in the inventive concept, the contact force of the contact member can be controlled by controlling the distribution of the pressing pressure of the elastic member.

That is, as described above, the wiper blade assembly according to the inventive concept includes the contact member and the elastic member which supports the contact member, and the contact member includes a body and a central portion which is located in a central area of the body.

The body includes a first body portion which extends from the central portion in a first direction, a first end which is located at an end of the first body portion, a second body portion which extends from the central portion in a second direction, and a second end which is located at an end of the second body portion. In addition, the body includes a first point which is located between the central portion and the first end and a second point which is located between the central portion and the second end.

In the inventive concept, a first contact force is evenly distributed in an area from the first point to the second point, a contact force in an area from the first point to the first end is greater than the first contact force, and a contact force in an area from the second point to the second end is greater than the first contact force.

Ultimately, in the contact member of the inventive concept, the first contact force is evenly distributed in the area from the first point to the second point, and the contact force in the other area, that is, the contact force in the area from the first point to the first end and the contact force in the area from the second point to the second end are greater than the first contact force.

In the inventive concept, when the first contact force is evenly distributed in the area from the first point to the second point of the contact member, it means that the same contact force is maintained over the area from the first point to the second point. However, since there can be an error, a change in contact force within an error range of ±1.5 gf/cm may be allowed.

In addition, when the contact force in the area from the first point to the first end of the contact member and the contact force in the area from the second point to the second end are greater than the first contact force, it means that the contact force is greater in the area from the first point to the first end and the area from the second point to the second end than in the area from the first point to the second point and that a maximum value of the contact force in the area from the first point to the first end and a maximum value of the contact force in the area from the second point to the second end are greater than the first contact force by a range of +4 to +6 gf/cm.

This is the same as the elastic member described above, and thus a detailed description will be omitted.

Ultimately, the wiper blade assembly according to the inventive concept can control the distribution of the pressing pressure of the elastic member and the distribution of the contact force of the contact member.

Accordingly, in the inventive concept, the ability of the contact member of the wiper blade assembly to follow the windshield of a vehicle can be improved.

That is, a wiper arm generally presses the wider blade assembly with a certain applied force, and the applied force causes the wiper blade assembly to be pressed against the windshield of the vehicle.

Here, to improve wiping characteristics of the wiper blade assembly, contact characteristics between the wiper blade assembly and the windshield of the vehicle should be superior. To this end, it is important to control the distribution of pressing pressure applied to the elastic member of the wiper blade assembly.

In the inventive concept, the distribution of the pressing pressure of the elastic member is controlled, and the contact force with which the contact member is pressed against the windshield of the vehicle is controlled by controlling the distribution of the pressing pressure of the elastic member. This improves the ability of the contact member to follow the windshield of the vehicle, thereby improving wiping characteristics of the wiper blade assembly.

Here, "improving the ability of the contact member to follow the windshield" refers to controlling the contact member to be pressed as closely as possible to the glass of the vehicle even at sharply curved ends of the glass.

More specifically, the pressing pressure of the elastic member is generally designed to be distributed evenly over the entire elastic member.

Therefore, if the pressing pressure of the elastic member is designed in a general way, that is, if the pressing pressure is distributed evenly over the entire elastic member, the contact member is not brought into close contact with the glass surface of the vehicle at sharply curved ends of the glass.

On the other hand, in the inventive concept, the pressing pressure is designed to be distributed evenly in a specific section and to increase in a section other than the specific section.

Since the pressing pressure of the elastic member is designed to increase in the section other than the specific section, the contact member can be brought into as close contact with the glass of the vehicle as possible even at sharply curved ends of the glass. This improves the ability of the contact member to follow the windshield of the vehicle.

According to the inventive concept, a wiper blade assembly which can control the distribution of the pressing pressure of an elastic member and the distribution of the contact force of a contact member can be provided.

In addition, in the inventive concept, the distribution of the pressing pressure applied to the elastic member is controlled, and the contact force with which the contact member is pressed against the windshield of a vehicle is controlled by controlling the distribution of the pressing pressure of the elastic member. This improves the ability of the contact member to follow the windshield of the vehicle, thereby improving wiping characteristics of the wiper blade assembly.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:
1. A wiper blade assembly comprising:
a contact member; and
an elastic member which supports the contact member, wherein the elastic member comprises a body and a central portion which is located in a central area of the body, wherein the body comprises a first body portion which extends from the central portion in a first direction, and a first end located at an end of the first body portion, a second body portion which extends from the central portion in a second direction, and a second end located at an end of the second body portion, and a first point located between the central portion and the first end and a second point located between the central portion and the second end, wherein the first point is any one of 1/3 through 3/4 points of the first body portion from the central portion, and the second point is any one of 1/3 through 3/4 points of the second body portion from the central portion, wherein the wiper blade assembly is coupled with a wiper arm configured to press the wiper blade assembly against a surface to be wiped such that there is an application of force generating pressing pressure, first pressing pressure is evenly distributed in an area from the first point to the second point, pressing pressure in an area from the first point to the first end is greater than the first pressing pressure, and pressing pressure in an area from the second point to the second end is greater than the first pressing pressure.

2. The wiper blade assembly of claim 1, wherein the first point and the second point are symmetrical to each other with respect to the central portion.

3. The wiper blade assembly of claim 2, wherein the even distribution of the first pressing pressure comprises a change in pressing pressure within an error range of ±1.5 gf/cm from a specific constant.

4. The wiper blade assembly of claim 2, wherein a maximum value of the pressing pressure in the area from the first point to the first end and a maximum value of the pressing pressure in the area from the second point to the second end are greater than the first pressing pressure by a range of +4 to +6 gf/cm.

* * * * *